No. 879,294. PATENTED FEB. 18, 1908.
W. J. MILLER.
MOLD.
APPLICATION FILED FEB. 4, 1907.
2 SHEETS—SHEET 1.
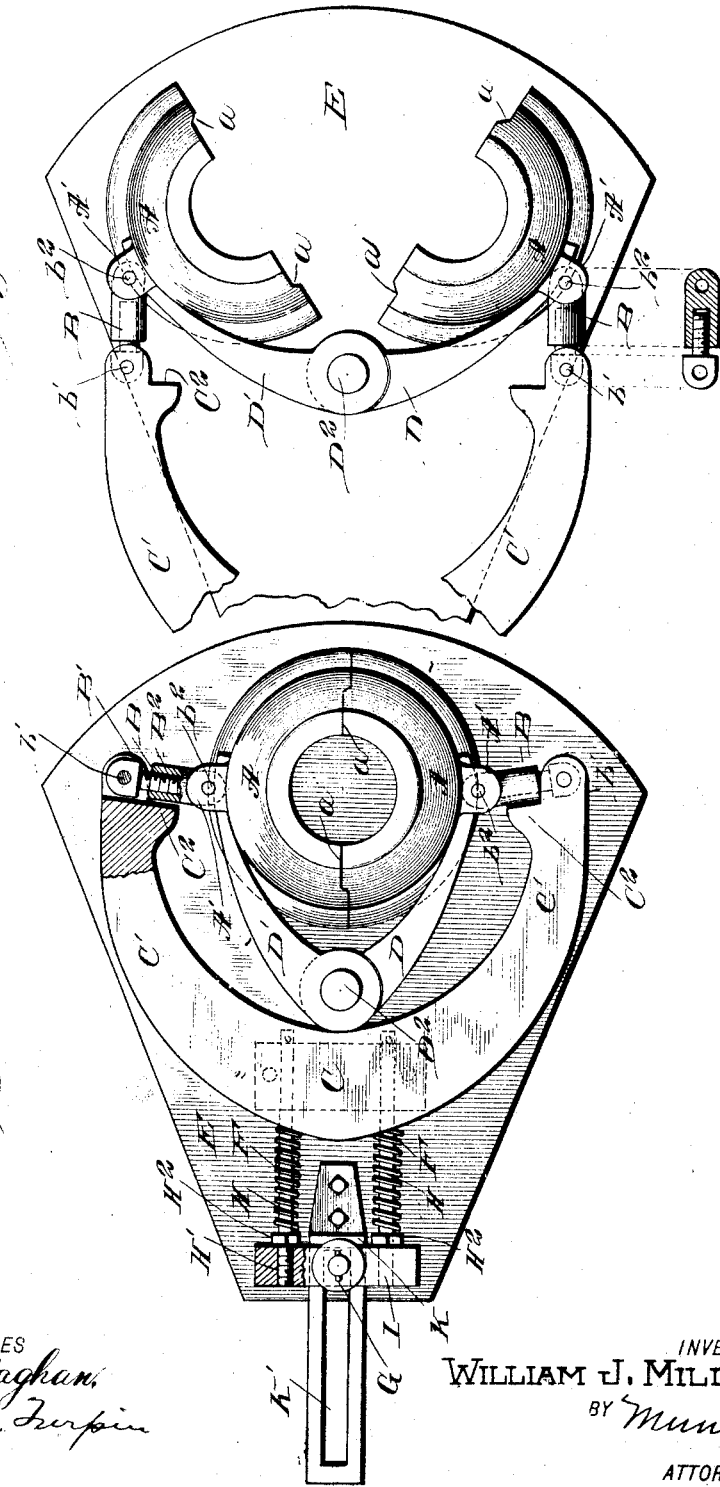
WITNESSES
INVENTOR
WILLIAM J. MILLER
BY
ATTORNEYS

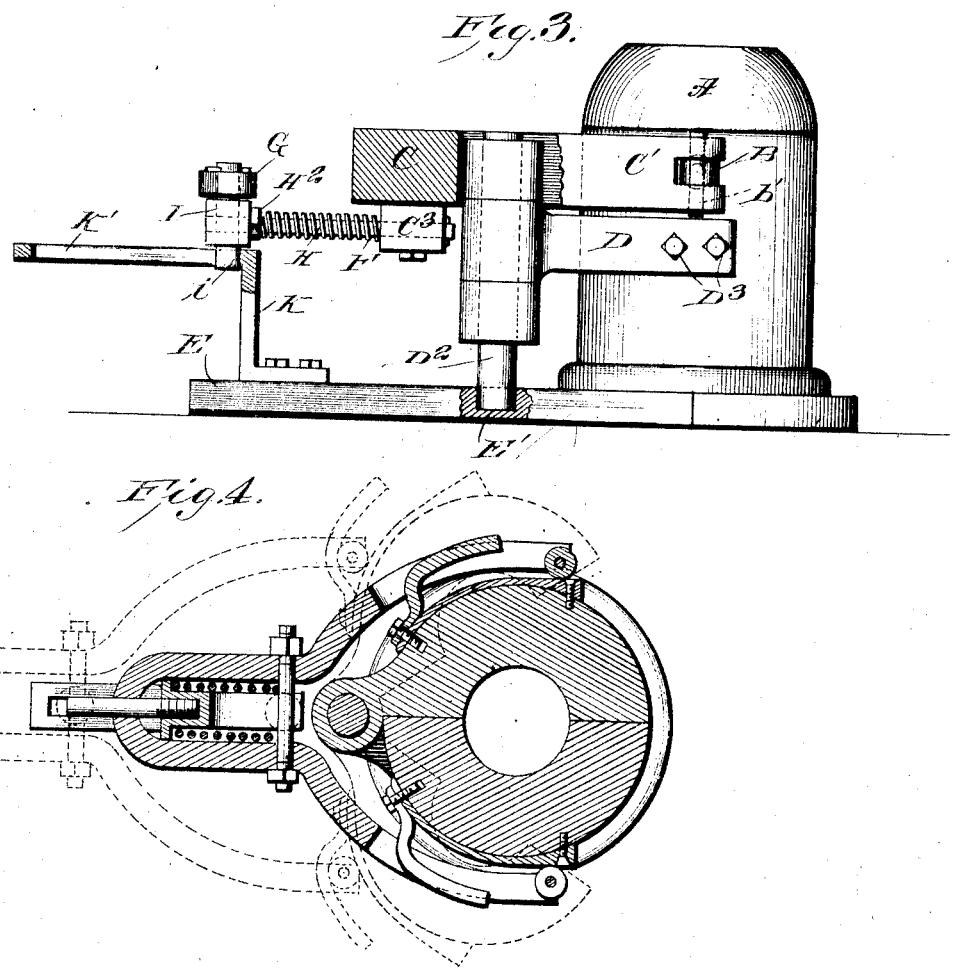

UNITED STATES PATENT OFFICE.

WILLIAM J. MILLER, OF COFFEYVILLE, KANSAS.

MOLD.

No. 879,294.   Specification of Letters Patent.   Patented Feb. 18, 1908.

Application filed February 4, 1907. Serial No. 355,570.

*To all whom it may concern:*

Be it known that I, WILLIAM J. MILLER, a citizen of the United States, and a resident of Coffeyville, in the county of Montgomery and State of Kansas, have invented certain new and useful Improvements in Molds, of which the following is a specification.

This invention is an improvement in molds for glass and other articles, being especially designed for use on glass molds; and the invention consists in certain novel constructions and combinations of parts as will be hereinafter described and claimed.

In the drawings—Figure 1 is a top plan view of an apparatus embodying my invention, the mold being closed. Fig. 2 is a detail top plan view showing the mold open. Fig. 3 is a side view of the apparatus, the mold being closed and parts being shown in section. Fig. 4 illustrates a somewhat different construction for locking the mold sections closed.

The mold sections A are semi-cylindrical in form and are provided at their meeting edges with rabbeted joints $a$ which operate to bring the sections into perfect alinement when closed. On their outer sides the sections A are provided with lugs A' to which are pivoted the inner ends of the adjustable connections B between the mold sections and the arms C' of the yoke C. To the outer ends of the mold sections A are secured the leaves or sections D and D' of the hinge, the outer ends of the sections D and D' being secured rigidly to the mold sections by bolts $D^3$, or in any other suitable manner, and the meeting ends of the sections D and D' being connected by the pintle $D^2$ which extends down into the socket E' in the base E. The lugs A' are arranged at approximately diametrically opposite points and the hinge being made separate from the mold sections may be interchangeably used on different mold sections so the molds may be renewed or replaced whenever desired.

The arms C' of the yoke C are pivotally connected at $b'$ with the outer section B' of the adjustable connection B, the inner sections $B^2$ of said connections being pivoted at $b^2$ in connection with the mold sections, as best shown in Figs. 1 and 2 of the drawings. The yoke arms C' are provided at their inner sides adjacent to their extremities with the forwardly facing shoulders $C^2$ which abut the connections B when the yoke is pushed forward to the position shown in Fig. 1 and limit the forward movement of the yoke to prevent its being carried too far beyond the dead center.

By the described construction it will be noticed that the movement of the yoke C in a direction radial to the mold will tend to positively open and close the mold by swinging its sections upon the pivot $D^2$ of the hinge and that when the mold is closed the yoke being pushed to a point near to or at or beyond the dead center, the mold will be positively locked so that no amount of pressure therein can force its sections apart and yet a slight rearward movement on the yoke will release the mold sections and will then permit said sections to be opened wide, as shown in Fig. 2 by continuing the rearward movement of the yoke.

It will be noticed that the opposite arms of the yoke are rigid with each other and that the yoke is moved bodily in a direction radial to the mold. Means are provided for retracting the yoke to open the mold sections and for advancing the yoke to close such sections, I employ springs F on rods H, and a roller G which may be operated upon by a cam lever or may be operated by hand power or otherwise as desired for advancing and retracting the yoke.

In the construction shown in Figs. 1, 2 and 3, the rods H are connected at one end H' with the roller carrier I being preferably screwed into said roller carrier I, as shown in Fig. 3, and sliding at their other ends loosely through openings provided in connection with the yoke C and preferably in a block $C^3$ secured on the under side of the yoke at the juncture of its arms, springs F operating on the rods H between the yoke block $C^3$ and nuts $H^2$ on the rods H, as best shown in Figs. 2 and 3, the springs forming a yielding connection between the operating carrier or cross head I and the yoke to cushion the operation of the yoke as will be understood from Figs. 1 and 3 of the drawings.

The roller carrier or cross head I is guided in alinement with the pintle $D^2$ of the hinge between the mold sections and this is effected in the construction shown in Figs. 1 and 3 by means of a pin $i$ on the under side of the carrier I operating in a slot K' in a bracket K mounted on the base E, see Figs. 1 and 3.

In operation and as best illustrated in Fig. 1, it will be noticed that when the mold is closed the yoke is moved to or nearly to or past the dead center of the mold thus locking the mold sections securely together. This is an important feature of my invention.

It will be understood that in the broad features of my invention I do not desire to be limited to the specific construction as shown in Figs. 1, 2 and 3, as the invention may be carried out in different ways, such, for instance, as illustrated in Fig. 4, in which the arms of the yoke embrace the mold and extend in the closed position of the mold past the dead center thereof to lock the sections of the mold in closed position. In this construction shown in Fig. 4, the arms of the yoke are not connected positively with the mold sections but have a sliding engagement therewith so that when the arms of the yoke are advanced the mold sections will be pressed to and locked in closed position and means are provided whereby as the yoke is retracted it will open the mold sections. The specific construction shown in Fig. 4 so far as it differs from that shown in Figs. 1, 2 and 3 is not claimed herein, but forms the subject-matter of a separate application for patent filed by me in the United States Patent Office, February 4, 1907, Serial No. 355,571.

What I claim is—

1. The combination of a base, a mold having detachable sections, a hinge for said mold having a pintle connected with the base and arms secured to their respective sections of the mold, a yoke having its arms rigid with each other and embracing the mold, links connecting the mold sections with the yoke arms and pivoted to such parts, said links being made in sections adjustably connected and the yoke being provided with shoulders to engage said links whereby to limit the advancing movement of the yoke, a reciprocating carrier for moving the yoke, and springs between the said carrier and yoke, substantially as set forth.

2. A mold made in detachable sections combined with a yoke movable bodily in a direction radial to the mold and having its arms rigid with each other and embracing the mold and arranged at the extremities of said arms to extend adjacent to or past the dead center of the mold and lock the sections thereof in closed position, substantially as set forth.

3. The combination with separable mold sections, of a yoke open at the end for opening and closing said sections and with the extremities of its open end movable in the closed position of the sections to a point adjacent to or past the dead center thereof whereby to lock the sections from opening until the yoke is retracted, substantially as set forth.

4. The combination of separable mold sections, and a yoke connected therewith to operate the same and open at one end and having its arms rigidly connected, and arranged at their extremities to operate the mold sections and means for moving the yoke in a direction radial to the mold, substantially as set forth.

5. The combination with separable mold sections, of a yoke open at one end and having its arms rigid with each other and free at one end and embracing the mold and connections between the free ends of the yoke arms and mold sections and pivotally connected with such parts, substantially as set forth.

6. The combination with a mold having separable sections, of a yoke having its arms rigid with each other, and embracing the mold, and having an operative movement in a direction radial to the mold and swinging connections between the yoke arms and the mold sections, substantially as set forth.

7. A mold having separable sections combined with a yoke having its arms rigid with each other and movable in a direction radial to the mold, the yoke arms embracing the mold, and links forming connections between the mold sections and the yoke arms, said links being pivoted at one end to the mold sections and at their other ends to the yoke arms and being made in sections adjustably connected, substantially as set forth.

8. The combination with the mold having the separable sections, of the yoke having its arms embracing the mold, swinging links pivoted at their inner ends to the mold sections and at their outer ends to the yoke arms, and abutments on the yoke arms for engagement with said swinging links whereby to limit the advancing movement of the yoke, substantially as set forth.

9. The combination of the base, the mold having separable sections, the hinge having its sections secured to the mold sections, and a pintle held to the base, a sliding carrier connected with the yoke for operating the same, and guides for directing the movement of said carrier in alinement with the pintle of the hinge, substantially as set forth.

10. A mold having separable sections and a locking device therefor movable in a direction radial to the mold to a point adjacent to or past the dead center whereby to prevent the opening of the mold by internal pressure, substantially as set forth.

11. A mold having separable sections, and a yoke having its arms rigid with each other and embracing the said sections and movable radially to the mold, adjustable links connecting the mold sections with the yoke arms, a carrier for operating said yoke, and yieldingly connected therewith, and guide devices for said carrier, substantially as set forth.

12. A mold having separable sections combined with a yoke embracing said mold, and movable longitudinally in a direction radial to the mold and swinging links connecting the yoke arms with the mold sections the yoke arms being provided with abutments in engagement with said links whereby to limit the advance movement of the yoke, substantially as set forth.

13. A mold having separable sections, and a yoke embracing said mold movable in a direction radial thereto and having its arms movable at their extremities adjacent to or beyond the dead center of the mold whereby to lock the sections of the mold against opening by internal pressure, substantially as set forth.

14. A mold having separable sections combined with a yoke having its arms rigid with each other and movable in a direction radial to the mold with the free ends of the yoke arms embracing the mold, and links connecting the yoke arms with the mold sections, substantially as set forth.

15. The combination of a mold in separable sections with a yoke movable longitudinally in a direction radial to the mold and having portions embracing the same and movable in the closed position of the mold sections adjacent to the dead center thereof.

WILLIAM J. MILLER.

Witnesses:
A. B. GREGG,
J. F. KEEFAUVER.